United States Patent Office 2,945,012
Patented July 12, 1960

2,945,012
POLYMERIZABLE POLYESTERS AND POLYMERS THEREOF

Alan R. Berens, Hudson, Ohio, assignor to The B. F. Goodrich Company, New York, N.Y., a corporation of New York No Drawing. Filed Jan. 8, 1958, Ser. No. 707,684

7 Claims. (Cl. 260—78.3)

The present invention relates to the preparation of novel, polymerizable mono-unsaturated esters of high molecular weight polyesters. More particularly, the invention relates to mono-unsaturated esters of a polymerized caprolactone and to polymers thereof.

According to the present invention, a new and novel class of polymerizable materials comprise the mono-unsaturated esters of a high molecular weight polyester, the mono-unsaturated ester comprising a polyester chain containing an average of more than two consecutively-connected repeating units, per molecule, derived from the self-condensation of an epsilon-caprolactone having as substituents on the caprolactone chain carbon atoms only hydrocarbon groups and having, on one end of the chain, a terminally-unsaturated $CH_2=C<$ grouping containing up to about 5 carbon atoms, and on the other end of the chain a terminal group inert in polymerization. These esters have not more than one polymerizable grouping per molecule. Such materials may have the following generalized structure:

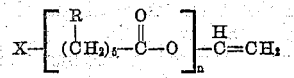

wherein X is a substituent selected from the class consisting of

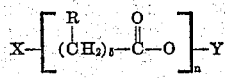

$CH_2=\overset{\downarrow}{C}-O-$, $H-O-$, $R''-O-$, $H-S-$, $R''-S-$ and

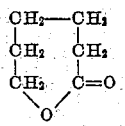

Y is selected from the class consisting of

hydrogen,

and alkyl; $n$ is an average number greater than 2; R is selected from the class consisting of hydrogen and alkyl; R' is an alkyl group containing less than 3 carbon groups; R'' is an alkyl group and wherein only one of X and Y in the same molecule can be unsaturated.

Various preferred sub-classes of materials within the broader class include the acrylate-, methacrylate- and ethacrylate-esters of the caprolactone polyester, these materials having the general structure:

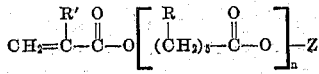

wherein R, R' and Z are each independently selected from the class consisting of hydrogen and alkyl and $n$ is an average number between about 3 and about 23 (corresponding approximately to a polylactone of molecular weight of between about 500 and about 3500). Another sub-class of such materials is the vinyl esters of the polyester, of the following general structure:

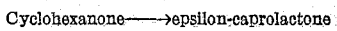

wherein X, R, and $n$ are as defined above. All of these unsaturated monoesters are readily polymerizable, forming polymers of highly novel and useful properties. The polymerized forms of these esters are, in reality, "graft" polymers because they have a vinyl backbone to which are attached polymeric polyester side chains.

These mono-unsaturated esters of a polyester can be derived most easily from an epsilon-caprolactone having the structure:

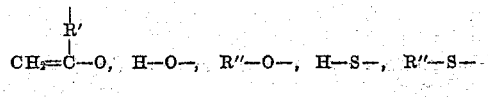

wherein any of the methylene hydrogen atoms can be replaced with a methyl, ethyl, octyl or other hydrocarbon (R group, above) substituent, preferably containing up to about 10 carbon atoms. Substituents other than hydrogen or hydrocarbon may interfere with polyester formation. These lactones can be derived by treating the corresponding cyclohexanone with per-acetic acid. Illustrative cyclohexanones and the corresponding lactone made therefrom are listed below:

Cyclohexanone⟶epsilon-caprolactone
2-methylcyclohexanone⟶epsilon-methyl-epsilon-caprolactone
4-methylcyclohexanone⟶gamma-methyl-epsilon-caprolactone
3- and 4-methylcyclohexanone⟶
    beta-gamma- and delta-methyl-epsilon-caprolactones
3,4-dimethyl methylcyclohexanone⟶
    beta-, gamma-, and delta-methyl-epsilon-caprolactone
2,6 dimethyl methylcyclohexanone⟶
    alpha-, epsilon-dimethyl-epsilon-caprolactone
3,3,5-trimethylcyclohexanone⟶
    beta-, beta-, delta- and beta-, delta-, delta-trimethyl-epsilon-caprolactone
2- and 4-octylcyclohexanones⟶
    gamma- and epsilon-octyl-epsilon-caprolactones The preparation of these and still other caprolactones is more fully described by Young et al., September 1956, J.A.C.S. preprint, page 108. Briefly, the reference shows how the caprolactone can be made by treating the corresponding cycohexanone with peracetic acid.

The epsilon-caprolactone is "polymerized" or condensed for use in this invention by treating it with an "initiator" substance containing but a single "active hydrogen." By the latter term is meant any substance containing a single ionizable or active hydrogen atom reactive with the cyclohexanone, i.e. containing active hydrogen as determined by the Zerewitinoff method. (Zerewitinoff, Ber., 40, 2023 (1907); Ber., 41, 2236 (1908); Kohler, J. Am. Chem. Soc., 49, 3181 (1927).)

Active-hydrogen containing compounds of this latter group include water or aqueous mineral acids, monohydric alcohols, monofunctional (i.e. di-substituted

amines, mono-carboxylic acids (which may be unsaturated such as acrylic acid itself), active-SH compounds such as mercaptans and thioacids, monohydric hydroxides such as sodium, potassium and ammonium hydroxides, and others. The molar proportion of "initiator," with respect to the moles of lactone, controls the molecular weight of the polymeric condensate, with the higher initiator proportions being required to produce the lower molecular weight condensates. In this fashion it is possible to produce polyesters ranging from as low as about 200 to as high as 10,000 or more in molecular weight. As indicated above, the lactones should be condensed to form a polyester containing an average of more than two repeating lactone-derived units to be suitable for use in this invention. Much preferred are polyesters having a molecular weight in excess of about 350. Especially suitable for use in the preparation of vinyl chloride copolymers are polyesters of molecular weight between about 500 and 3,500.

If the "initiator" is water and the lactone is epsilon-caprolactone, the resulting polyester will have the following formula:

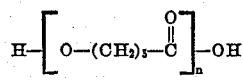

wherein $n$ is as defined above. Such a material is a polyester terminated on one end with a hydroxyl group and on the other by a carboxyl group. If the initiator is an alcohol, the polyester is terminated by a hydroxyl on one end and by an ester group on the other. Similarly, an amine initiator will produce a polyester having an amide group on one end and an hydroxyl on the other. A mono-carboxylic acid, for example acrylic acid itself, produces a polyester having an acrylate ester group on one end and a carboxyl group on the other, the product in this case being a polymerizable polyester-acrylate of this invention obtained directly in one step.

If one employs a difunctional "initiator" such as ethylene glycol, the product would be a polyester of the following structure:

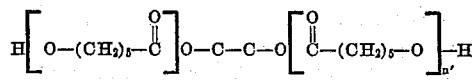

In other words, the product is terminated on either end by an hydroxyl group and, for this reason, could be classified as a high molecular weight polymeric glycol. Esterification of such a material with acrylyl chloride would produce a polymeric diacrylate, a material to be avoided at all costs for most of the more important uses now envisioned for the polyester-acrylates. Similarly, all polyfunctional (i.e. 2 or more active-hydrogens) "initiators" should be avoided because their use will inevitably lead to branched polyester-acrylates containing more than one acrylate group per molecule. Since the primary field of application for the polyester-acrylates as now envisioned, is in the production of copolymers, and particularly those with vinyl chloride and/or vinylidene chloride, even quite small proportions of di-acrylate or poly-acrylate groupings on the polyester inevitably lead to cross-linking and the production of insoluble, non-fusible copolymers.

In the practice of this invention, the preferred polyesters are those condensed with water, a monohydric alcohol, or an appropriate monocarboxylic acid, most preferably, an unsaturated readily polymerizable acrylic acid of the structure

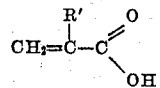

wherein R' is hydrogen, a methyl group or an ethyl group. Most preferred are the alcohol-condensed and acrylic acid condensed polyesters of molecular weight between about 500 and about 3,500.

The polyester, if condensed with other than an acrylic acid, is esterified with an acrylic acid, or its equivalents, to convert the polyester to what is referred to herein as a polyester-acrylate, or with vinyl acetate or other vinyl ester to produce a vinyl ester of the polyester (by ester-interchange) to produce a vinyloxy-polyester. Perhaps most convenient is to react the hydroxyl-containing form of the polyester with an acrylyl chloride or with an acrylic anhydride to insure a high percentage (i.e. a high proportion of the polyester molecules esterified) of acrylate ester groupings on the chains of the final product. Since it is desired to have up to, but not higher than, an average of one acrylate or vinyloxy group per molecule, the actual weight percentage of acrylate or vinyloxy, for a given percent esterification will vary with molecular weight. It is desirable, on a mole-to-mole basis, to so conduct the esterification so as to incorporate at least 0.35 mole of the acrylic acid or vinyl alcohol for every one mole of polyester. In many uses, the unesterified polyester is a mere diluent or plasticizer which can be advantageous, or it can be harmful, depending on the application. Usually it is better to drive the esterification to essential completion (i.e. at least 90–95%). Following acrylation or vinylation, for many uses, it is desirable to further treat those polyesters containing a free carboxyl group with an alcohol, an amine, or other reagent to react with the carboxyl and reduce its hydrophilic character. In some cases, this may be done after the polymerization step has been completed.

One or more of the polyester-acrylates or vinyloxy-polyesters can be polymerized by themselves to produce thick, viscous oils, greases or wax-like substances, or rubbery gels of high molecular weight or they can be copolymerized with one or more other copolymerizable $CH_2=C<$ containing monomers to produce interesting and unique copolymers. Of primary interest are the copolymerization products produced by polymerizing from about 2% to about 75% by weight of the mono-unsaturated polyester with one or more $CH_2=C<$ type monomers which normally homopolymerize to produce hard, stiff and horny homopolymers requiring more or less plasticization or lubrication for ease in processing and for wide application. The copolymerization of minor proportions of one or more of the mono-unsaturated polyesters of this invention with one or more monomers such as vinylchloride, vinylidene chloride, acrylonitrile, styrene and the like, particularly with vinyl chloride and/or vinylidene chloride, produces "graft" copolymers of most unique properties. Such materials are plasticized in a unique fashion with a non-extractible chemically-bound plasticizing ingredient.

The mono-unsaturated polyesters of this invention can be polymerized with any $CH_2=C<$ containing monomer including the monomers mentioned above, and in addition, vinyl acetate, vinylidene fluoride, vinylidene cyanide, alkyl acrylates such as methyl and ethyl acrylates, acrylamide-type monomers such as acrylamide, methacrylamide, N,N'-dimethyl acrylamide, and others, ethylene, propylene, and other 1-monoolefins, vinyl cyclobutane, the fluoroethylenes, dienes such as butadiene, isoprene, and cyclopentadiene, and many others. Most preferred are the ethylene halides such as vinyl chloride, vinyl bromide, vinyl fluoride, vinylidene chloride, vinylidene bromide, and vinylidene fluoride. The latter class of monomers normally form especially tough and hard homopolymers ideally suited to plasticization by the polyester-acrylate. More than one comonomer may be employed to produce multi-component interpolymers of the polyester-acrylate.

For example, copolymers of vinyl chloride with from about 2% to about 50% by weight, based on the total weight of monomers, of one or more polyester-acrylates produces copolymers which can be processed without plasticizers and lubricants, which fuse or coalesce quite readily, and which nevertheless have flow points approaching those of plasticized polyvinyl chloride of equivalent processing characteristics and physical properties. Thus, these copolymers have a much wider range of tolerance to temperatures than is common in the so-called internally-plasticized copolymers. When other known "plasticizing co-monomers" such as ethyl acrylate, vinylidene chloride, vinyl acetate, and the like are copolymerized with vinyl chloride, the resulting copolymer is more flexible (lowered second order transition temperature) and it also has materially lowered flow points, the flow point being lowered so drastically in most cases as to severely limit the utility of the copolymer. Unlike such low molecular weight "monomeric" co-monomers, the high molecular weight polyester-acrylates have considerably less effect on the flow point of the copolymer than on the transition temperature, thereby making for a copolymer having a wider useful temperature range.

It is envisioned that because of the great disparity between the molecular weight of vinyl chloride and the mono-unsaturated polyester, the actual molar combining ratios of the two substances are quite low. For example, when a polyester-acrylate of 3000 molecular weight is copolymerized with about an equal weight of vinyl chloride, it is estimated that the copolymer contains only one mole of polyester-acrylate for every 50 moles or more of vinyl chloride. This means that the copolymer comprises a back-bone made up of vinyl chloride units interrupted at widely-spaced intervals by a long, polyester-acrylate side chain. This being the case, the polyester-acrylate would not interfere substantially with the establishment of the normal polyvinyl chloride inter-chain and intra-chain forces, yet on mechanical deformation the long, flexible polyester side chains plasticize or lubricate the chains and permit segmental motion at lower temperatures. Because the normal "Vander Waal" forces are present, the flow temperatures are not lowered appreciably and the copolymer will be useful at much higher temperatures than similar copolymers made up of vinyl chloride chains frequently interrupted with short, stiff side chains. The useful temperature spread or "$\Delta T$" of a copolymer of this invention will be of the order of 80 to 100° C. or more as compared to about 80° C. for a good grade of externally-plasticized polyvinyl chloride, and only 20 to 50° C. for many vinyl chloride/alkyl acrylate and vinyl chloride/vinyl acetate copolymers. In their $\Delta T$ values, the copolymers of this invention resemble more closely an externally-plasticized polyvinyl chloride than any of the more conventional copolymers.

The polyester-acrylates will polymerize spontaneously on long standing. Generally, however, the use of a catalyst is required such as any of the well-known peroxygen compounds such as the organic and inorganic peroxides, hydroperoxides, persulfates, perborates, the so-called "redox" catalysts, alkyl borane/oxidizing agent combinations, silver alkyl/oxidant combinations, and others. The polymerization can be carried out in mass, in solution, or in suspended or dispersed forms. For the preparation of the preferred copolymers with the ethylene halides, the polymerization is best carried out in water, aqueous alcohol or aqueous antifreeze solutions in the presence of either an efficient suspending agent to obtain a granular resin, or in the presence of an efficient dispersing agent to obtain a latex-like dispersion of polymer. Suitable suspending agents include such materials as polyvinyl alcohol, gelatin, bentonite clay and others. Suitable dispersing agents include the fatty alcohol sulfates, the alkaryl sulfonates, and others such as sodium lauryl sulfate, sodium decyl benzene sulfonate, isobutyl naphthalene sodium sulfonate, the sodium salt of N-octadecyl-N-1,2-dicarboxyethyl sulfosuccinamate, and many others. The polymerization can be carried out at a temperature in the range of from about −30° to about 75° C. A preferred range of temperatures is from about −20° to 50° C. The flexibility and toughness are improved at the lower polymerization temperatures utilizing any of the low temperature "redox," alkyl borane/oxidant, or silver alkyl/oxidant combinations.

The invention will now be more fully described with reference to the preparation of illustrative polyester-acrylates and their polymerization.

Example I

In this example the preparation of a caprolactone polyester will be described. A three-necked, 5-liter glass flask equipped with a mechanical stirrer, a thermometer, a condenser and a dropping funnel is charged with a mixture of 525 ml. (490 grams) of cyclohexanone and about 2 liters of chloroform as a solvent-diluent. Then 47.5 grams of anhydrous sodium acetate are added, the flask closed, and 839 ml. (950 grams) of 40% peracetic acid are added gradually in a dropwise fashion. In the first 45 minutes, after a total of about 190 ml. of the acid have been added, heat is applied to warm the mixture to 45 to 65° C. The remainder of the peracetic acid is then added in 225–300 ml. portions at 1–2 hour intervals. After all the acid has been added, the mixture is allowed to stand for 10–11 hours at 50–60° C. Then 15 grams of activated carbon are added followed by 400 ml. of water. The resulting mixture is agitated at 58–63° C. for about 2 hours and then cooled and filtered. To the cool filtrate there are added 10 grams of ferrous sulfate and the mixture shaken and separated into layers in a separatory funnel. The aqueous layer is shaken with chloroform and the chloroform extract added to the chloroform layer. The latter is again treated with ferrous sulfate and water to destroy the last traces of peroxide and the mixture separated, the aqueous layer extracted with chloroform and the combined chloroform layers treated with 400 ml. of water and 10 grams of sodium acetate. The chloroform layer is separated and dried over anhydrous $Na_2SO_4$ and the dried chloroform layer then distilled under vacuum to remove the chloroform and any acetic acid present. Then the residue is distilled at 0.5 to 0.7 mm. taking care to remove unreacted cyclohexanone to obtain a yield of 510 grams of epsilon-caprolactone (melting point of −3° C. and $n_D^{20}=1.4629$).

The epsilon-caprolactone is then condensed or "polymerized" using water as an initiator. A mixture of 100 grams of the caprolactone and 3 ml. of an aqueous $H_2SO_4$ solution (1.653 grams $H_2SO_4$ diluted to 50 ml. with water) is heated in a flask at 123–141° C. for 107 minutes. The flask containing the mixture is then connected to a vacuum pump through a Dry Ice trap to draw off low molecular weight materials. The trap is found to contain water only. The product is then tested by the acid number procedure and found to have an acid number of 40.2 corresponding to a calculated molecular weight of 1398. The resulting polyester is somewhat viscous and of a light color.

Example II

A mixture of 50 grams of the polyester of Example I (0.0357 mole) and 300 ml. of benzene are charged to a flask and 50 ml. of benzene are distilled off to remove excess water. The remaining liquid then is cooled to about 8° C. and 3.8 grams (0.0482 mole) of pyridine are added. An equimolar quantity of granular polyvinyl pyridine could be substituted for the pyridine to act as an HCl-acceptor. Then 3.81 grams (0.0423 mole) of acrylyl chloride are added and the mixture allowed to stand with agitation overnight at room temperature. In the morning an oil bath is applied to the flask to heat the contents to a pot temperature of about 50° C. for a period of one hour. The heat is cut off and the mix again allowed to stand overnight. On the second morning sufficient water is added to precipitate the polyester. To the suspended, precipitated polyester there are added 40 ml. of 20:1 hydrochloric acid/$H_2O$ mixture and 600 ml. of saturated NaCl solution, the mix shaken, and then filtered. The solid polyester-acrylate filter cake is then transferred to a beaker, broken up in 100 ml. of water, stirred and then filtered again. The second filter cake is rinsed with 75 ml. of water and then dried at 30–40° C. under vacuum for 6 hours. The partially-dried solid is crushed in a mortar and then dried for an additional 6 hours at 30–50° C.

under a vacuum of 0.1 mm. Hg. A yield of 45.4 grams is obtained.

Analysis of the resulting polyester-acrylate is carried out by dissolving 0.314 gram thereof in 25 ml. of ethyl acetate and adding thereto an excess of dodecyl mercaptan (as a solution in methanol). Then 2.5 ml. of "Triton B," a non-ionic dispersant are added as a basic catalyst. The mix is then allowed to stand for 2 minutes before 3 ml. of glacial acetic acid are added and the mix diluted with 125 ml. of ethanol. An aliquot portion of the diluted solution is titrated with iodine solution and the molecular weight calculated from the unsaturation value obtained. The molecular weight by the "iodine-number" procedure is 1860 whereas by acid number it is 1700.

*Example III*

The caprolactone polyester-acrylate of Example I is copolymerized with vinyl chloride in an aqueous medium made up according to the recipe:

|  | Parts/wt. |
|---|---|
| Monomers (total) | 100 |
| Water | 250 |
| "Nekal AEMA"[1] | 0.6 |
| NaHCO$_3$ | 0.6 |
| Caprylyl peroxide | 0.5 |

[1] A commercial suspending-dispersing agent said to comprise a mixture of isobutyl naphthalene sodium sulfonate and gelatin.

The water and water-soluble ingredients are combined and the resulting mixture is then frozen and the reactor evacuated. The polyester-acrylate is then added to the reactor. Finally, liquid vinyl chloride is sucked into the reactor utilizing the vacuum existing in the reactor. The reactor is sealed and heat is applied, the temperature being maintained at about 50° C. for about 16 hours while agitating the mixture. The copolymer is obtained as a slurry of granular, white polymer which is worked up by adding methanol (to extract uncombined polyester) and filtering followed by successive water and methanol washes. The alcohol-wetted cake is then dried in a vacuum oven at 50° C. The table below lists the monomeric mixtures, percent/weight vinyl chloride by chlorine analysis, percent/weight yield based on total monomers, the percent/weight of the copolymer soluble in methyl ethyl ketone after extraction for 16 hours at 50° C., the $T_1$ value (temperature at which copolymer consolidates to a solid mass under 3200 lbs./sq. in. pressure), the $T_2$ value (temperature at which the resin flows under the same pressure), and the $\Delta T$ value ($T_2-T_1$), all determined on the raw copolymer.

It will be noted that proportions from 0 to 60% of the polyester-acrylate copolymerizes smoothly with vinyl chloride with the chloride analysis indicating that the polyester-acrylate entered the polymer chain slightly more readily than did vinyl chloride.

It should further be noted that the M.E.K. solubility did not materially decrease, indicating an absence of cross-linking. This conclusion is supported by the steadily decreasing $T_1$ and $T_2$ values obtained with increasing polyester-acrylate content. It should be especially noted that the $T_2$ values decrease relatively more slowly, with increasing polyester-acrylate content, than does the $T_1$ value. This is true up to a polyester-acrylate content somewhere in the range of 40 to 60%. This change in polymer properties is highly novel. Normally, plasticization of a vinyl chloride with both external (i.e. oily added plasticizer) and internal (i.e. ordinary plasticizing comonomers) is accompanied by a more rapid change in $T_2$ value than in $T_1$. (See "VYHH," plasticized polyvinyl chloride, and vinyl chloride/2-ethylhexyl acrylate copolymer controls above.) It is for this latter reason that most known vinyl chloride copolymers have a more restricted "useful temperature range," and larger increases in sag and creep, as compared to externally-plasticized polyvinyl chloride. In comparison with polyvinyl chloride (Sample A, above) the copolymers of this example, containing between about 0 to about 60% polyester-acrylate, or slightly higher, have materially increased $\Delta T$ values. Of these copolymers, those containing not more than about 50% of the polyester-acrylate have higher $T_2$ values (i.e. higher flow points) than many vinyl chloride copolymers containing common "monomeric," low molecular weight copolymers and also higher than many forms of plasticized polyvinyl chloride. The nature of the $T_1$ and $T_2$ values indicate that these copolymers are much more easily processed than is polyvinyl chloride and can be employed in many of the same applications where high service temperatures render known vinyl chloride copolymers or plasticized homopolymers useless.

*Example IV*

The recipe of Sample E of Example III is duplicated a number of times on a larger scale giving an average yield of 83% of a granular copolymer having a $T_1$ of 9° C.; a $T_2$ of 108° C.; and a $\Delta T$ of 99° C. The copolymer is worked up in the usual fashion. The dried copolymer is mill massed and 1% by weight on the resin of dibutyl tin dilaurate stabilizer worked in. A portion of the material is then sheeted off and labelled Sample "A." Still another portion of the mill stock is then blended with 5%/wt. based on the copolymer of dioctyl phthalate plasticizer (Sample "B"). Both samples are then molded

| Sample No. | Grams Polyester-Acrylate | Grams Vinyl Chloride | Percent/Wt. Yield Copolymer | Percent/Wt. Vinyl Chloride | Percent/Wt. M.E.K. Solubility | $T_1$ | $T_2$ | $\Delta T$ |
|---|---|---|---|---|---|---|---|---|
| A | 0 | 5.0 | 85.6 | 99.5 | 92.4 | 96 | 152 | 56 |
| B | 0.5 | 4.5 | 94.4 | 90.6 | 80.4 | 72 | 150 | 78 |
| C | 1.0 | 4.0 | 90.8 | 80.8 | 80.4 | 56 | 144 | 88 |
| D | 1.5 | 3.5 | 81.4 | 70.0 | 68.6 | 32 | 129 | 97 |
| E | 2.0 | 3.0 | 72.8 | 61.1 | 65.8 | 6 | 112 | 106 |
| F | 2.5 | 2.5 | 60.4 | 44.6 | 66.2 | −18 | 81 | 99 |
| G | 3.0 | 2.0 | 56.4 | 36.2 | 73.2 | −32 | 48 | 80 |
| "VYHH" Control | | | | | | 74.5 | 102 | 27.5 |
| Polyvinyl Chloride+50 DOP | | | | | | 5 | 85 | 80 |
| Copolymer—67 Vinyl Chloride/33 2-ethylhexyl-acrylate | | | | | | 28 | 62 | 34 | into appropriate sheets for standard physical testing procedures. The best results are as follows:

PHYSICAL PROPERTIES AT ROOM TEMPERATURE

| Sample No. | Tensile, lbs./sq. in. | Yield Point, lbs./sq. in. | Initial Modulus, lbs./sq. in. | Ultimate Elong., Percent | Gehman Freeze Point, °C. | Brittleness Temperature, °C. |
|---|---|---|---|---|---|---|
| A | 2,820 | 1,340 | 2,510 | 234 | +5 | −20 |
| B | 2,440 | 923 | 1,490 | 271 | +1 | −15 |

PHYSICALS AT 75° C.

| | | | | | | |
|---|---|---|---|---|---|---|
| A | 890 | 190 | 550 | 281 | | |
| B | 760 | 275 | 395 | 350 | | |

The properties listed above are materially better than those of conventional copolymers, especially at 75° C. Many easily-processed copolymers have no strength at all at 75° C. because their $T_2$ values are so near (or actually below) this temperature.

The crumb-like, raw copolymers of Example III are ethanol extracted 5 times, each for a 16 hour period and each time employing fresh ethanol, and found to contain an average of only 2.18% of ethanol-soluble extract. Milled and molded Sample "B" shows 10.85% ethanol-soluble material. No soluble vinyl chloride can be found in any of the ethanol extracts, the latter being identified as mainly unpolymerized polyester-acrylate or non-acrylated polyester. In contrast, polyvinyl chloride plasticized with various commonly-employed liquid plasticizers, show the following ethanol-soluble extracts:

Percent/weight ethanol soluble extract
Polyvinyl chloride+50 phr. dioctyl phthalate ___ 26.92
Polyvinyl chloride+50 phr. "paraplex G 25"[1] ___ 22.64
Polyvinyl chloride+50 phr. "paraplex G 60"[1] ____ 25.56

[1] High molecular weight polymeric fatty acid/glycol polyesters.

Example V

In this example a branch-chained polyester-acrylate is employed as a comonomer in the copolymerization of vinyl chloride. The polyester-acrylate is produced by the procedure similar to that of Example I from a technical mixture of 3- and 4-methyl cyclohexanones (Mathieson) having an average molecular weight of 112. The methyl-substituted caprolactone is made by combining 112 grams of the mixed cyclohexanones, 9.5 grams of anhydrous sodium sulfate, 190 grams of 40% peracetic acid, and 1000 ml. of chloroform and heating the resultant mixture with agitation for about 6.5 hours at 40°–50° C. Then the mixture is allowed to stand without agitation at room temperature overnight. The next day 4 grams of activated carbon and 100 ml. of water are added and the mix again stirred for 1 hour at 55° C. and then cooled and filtered. The resulting light colored, slightly viscous solution is then worked up by the procedure shown in Example I.

The resulting mixed beta-, gamma-, and delta-methyl-epsilon-caprolactones are distilled under vacuum producing fraction having an $N_D^{20}$ value ranging from 1.4302 to 1.4602. The latter, totalling 133.8 grams, are combined and utilized in the production of a polyester. In the latter procedure, a mixture of 81.8 grams of the mixed caprolactones and 4.0 ml. of the water/$H_2SO_4$ mixture of Example I is heated at 150° to 160° C. for about 6 hours. The cooled mixture is then subjected to a vacuum of 13 mm. Hg for 1 hour at 50° C. to draw off volatiles (1.3 grams collected). The finished polyester is found to have a molecular weight, by the acid number procedure, of about 652.

The above polyester is acrylated by combining 54.1 grams of the polyester (1 mole), 10.5 grams of pyridine (1.6 moles), 9.7 grams of acrylyl chloride (1.3 moles) and 100 ml. of tetrahydrofurane, the acrylyl chloride being added to the remaining ingredients over a 25 minute period while cooling in an ice bath. The mix is then stirred overnight at room temperature and the next morning heated at 50° C. for 70 minutes. The reaction mixture is then cooled, 300 ml. of water added with agitation, allowed to stand and the solvent layer separated and distilled under vacuum to strip off the tetrahydrofurane. At this point there remains in the still pot a viscous semi-liquid which is taken up on ethyl ether, washed once with dilute aqueous hydrochloric acid, then 3 times with water and finally the ether solution is dried over anhydrous sodium sulfate. The ether is stripped off under atmospheric pressure and the stripping operation finished off under a vacuum of 0.2 mm. Hg at 50° C. for ½ hour. A yield of 35.7 grams of a semi-liquid polyester-acrylate is obtained. The molecular weight, as determined by the iodine number procedure, is about 1230.

The above-described methyl-substituted polyester-acrylate is employed in the preparation of vinyl chloride copolymers employing the recipe, procedure, conditions and proportions of Example III. The data are as follows:

| Sample No. | Percent/Wt. Yield | Percent/Wt. Soluble in M.E.K. | Percent/Wt. Combined Vinyl Chloride | $T_1$ | $T_2$ | $\Delta T$ |
|---|---|---|---|---|---|---|
| A | 90.4 | 93.0 | 99.5 | 97 | 156 | 59 |
| B | 76.6 | 96.4 | 91.8 | 84 | 148 | 64 |
| C | 59.2 | 98.8 | 86.3 | 73 | 133 | 60 |
| D | 48.4 | 100.0 | 77.6 | 50 | 117 | 67 |
| E | 37.0 | 97.6 | 64.1 | 25 | 94 | 69 |
| F | 30.8 | 98.6 | 52.4 | 8 | 68 | 60 |

It appears that the methyl-substituted polyester-acrylate is not as readily polymerizable as the corresponding unsubstituted polyester. However, the resins produced are somewhat softer than are the corresponding resins of Example III, although this may be due to low copolymer molecular weight. Samples B—D, above, are excellent resins of moderate rigidity when processed without added plasticizers.

Example VI

The procedure of Example V is repeated producing a methyl-substituted polyester-acrylate having a molecular weight of about 2500. The polyester is made as in Example V except for a reduced amount of water initiator to produce a polyester having a molecular weight of about 1560 (by the acid number procedure). The acrylation procedure is similar except for the use of a granular polyvinyl pyridine as the HCl-acceptor and benzene as the solvent-diluent. The product analyzes as containing 0.395 milliequivalent of acrylate/gram, an acid number of only 0.506, and a hydroxyl number of 0.102. This material is copolymerized with vinyl chloride in proportions, respectively, 30/70, to obtain an average yield of 55.8% by weight based on the monomers charged of a tough, flexible, translucent, soluble and completely fusible copolymer similar to those of the previous examples.

Example VII

In this example, commercially-available epsilon-caprolactone (carbon and carbide) is polymerized employing 1-butanol as the initiator. The procedure employs first mixing 279.8 grams of the lactone, 13.45 grams of 1-butanol, and 280 mg. of tetrabutyl titanate (esterification catalyst) and then heating at 155–170° C. for four hours and 20 minutes. The mix is then cooled and the excess n-butanol evaporated off under vacuum stripping at 80° C. and 0.2 mm. for about 3 hours. A total of 1.6 grams of an amber-colored distillate is separated in this way. The product, weighing 273.4 grams, is a solid polyester of good color having a molecular weight of about 1800 by the hydroxyl number method. Titration of the acid and —OH content of the polyester shows only 0.024 milliequivalent/gram of —OH.

A 250 gram portion of the thus obtained butanol-1 terminated polyester is mixed with 37.4 grams of solid, granular polyvinyl pyridine, 37.4 grams of acrylyl chloride and 1500 ml. of benezene and the mixture heated at 50° C. for 5 to 6 minutes. At this point 200 ml. of water are added and the mix again stirred for 3 hours. An emulsion forms which is very difficult to break. The emulsion is filtered to remove the polyvinyl pyridine solids and one volume of diethyl ether added for every 2 volumes of emulsion. Then the combined solution is washed with water until only a very slight test for chloride ion can be detected. The solution then is dried over anhydrous $CaSO_4$ and the solvent stripped off under high vacuum. The final polyester-acrylate is a solid having a molecular weight of about 2500 according to the iodine number procedure. When copolymerized with vinyl chloride, as was done in Example III, copolymers of closely similar properties are obtained.

Example VIII

The procedure of Example I is repeated utilizing considerably larger quantities of the water/$H_2SO_4$ initiator solution, thereby to obtain the carboxyl-hydroxyl forms of polyesters having, respectively, molecular weights of 342 and 807. These are acrylated by the method of Example II to produce polyester-acrylates of molecular weight, respectively, 630 and 1490. The latter are likewise copolymerized in proportions of 0 to 60% by weight with vinyl chloride to obtain copolymers of properties similar to the copolymers of, respectively, Example IV and Example III. It is concluded that the higher molecular weight polyester-acrylates (i.e. above 500 to 1000 molecular weight) are more efficient plasticizing monomers and produce copolymers having better ΔT values and better low temperature flexibilities.

Example IX

In this example, the polyester-acrylate (PEMA) of Example VI, prepared from a methyl-substituted epsilon-caprolactone polyester having a molecular weight of above 2500, is polymerized, according to the recipe of Example III, in one case, with vinylidene chloride and, in another case, with acrylonitrile. The data are as follows:

| Sample No. | Monomers—Parts/Wt. | | | Analysis | | |
|---|---|---|---|---|---|---|
| | PEMA | Vinylidene Chlorine | Acrylonitrile | Percent Conversion | Percent Chlorine | Percent Nitrogen |
| A | | 100 | | 84 | 72.24 | |
| B | 40 | 60 | | 59 | 55.39 | |
| C | | | 100 | 85 | | 26.02 |
| D | 40 | | 60 | 74 | | 20.33 |

Resin B, above, is a flexible, tough material that is easily milled and molded without plasticizer. Its consolidation point is lower than that of resin A yet its softening point is higher than that of vinylidene chloride/vinyl acetate copolymer of equivalent processability. Resin D is somewhat more easily processable than is polyacrylonitrile (resin C) but the improvement in properties is not of the same order as that obtained with vinyl and vinylidene chloride copolymers ostensibly because of lack of compatibility between the polyester side chains and the acrylonitrile backbone of the copolymer chain.

What is claimed is:
1. A copolymer of a monomeric mixture consisting of (1) from 50 to 98%/wt. of a haloethylene selected from the class consisting of vinyl chloride, vinyl bromide, vinyl fluoride, vinylidene chloride, vinylidene bromide and vinylidene fluoride and (2) from 2 to 50%/wt. of a mono-unsaturated mono-ester of a poly-caprolactone polyester, said mono-unsaturated ester having the structure:

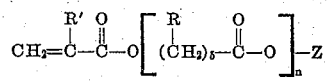

wherein R, R′ and Z are each independently selected from the class consisting of hydrogen and alkyl and $n$ is an average number between about 3 and about 23.

2. A copolymer as defined in claim 1 wherein the said haloethylene is vinyl chloride.
3. A copolymer as defined in claim 1 wherein the said haloethylene is vinylidene chloride.
4. A copolymer as defined in claim 1 wherein the said haloethylene is vinyl chloride and the said mono-unsaturated mono-ester has a structure wherein R and R′ are hydrogen and Z is an alkyl group.
5. A copolymer as defined in claim 1 wherein the said haloethylene is vinyl chloride and the said mono-unsaturated mono-ester has the structure wherein R is methyl and R′ and Z are hydrogen.
6. A copolymer as defined in claim 1 wherein the said haloethylene is vinyl chloride and the said mono-unsaturated monoester has a structure wherein R and R′ are hydrogen and Z is a butyl group.
7. A copolymer as defined in claim 1 wherein the said haloethylene is vinyl chloride and the said mono-unsaturated monoester has a structure wherein R, R′ and Z are hydrogen.

References Cited in the file of this patent

UNITED STATES PATENTS

| | | |
|---|---|---|
| 2,141,546 | Strain | Dec. 27, 1938 |
| 2,311,543 | Gleason | Feb. 16, 1943 |
| 2,534,255 | Filachione et al. | Dec. 19, 1950 |

OTHER REFERENCES

Carothers: Collected Papers Interscience, pages 235–239 (1940).

Hackh's Chemical Dictionary, 3rd ed., McGraw-Hill (1944), p. 17 under "acrylic acid."

UNITED STATES PATENT OFFICE

CERTIFICATE OF CORRECTION

Patent No. 2,945,012                                    July 12, 1960

Alan R. Berens

It is hereby certified that error appears in the printed specification of the above numbered patent requiring correction and that the said Letters Patent should read as corrected below.

Column 2, line 50, for "cycohexanone" read -- cyclohexanone --; column 4, line 47, for "polysters" read -- polyesters --; column 9, line 17, for '"paraplex G 25"' read -- "paraplex G 25" --; line 18, for '"paraplex G 60"' read -- "paraplex G 60" --; line 56, for "9.7 grams" read -- 9.77 grams --; column 10, line 44, for "(carbon and carbide)" read -- (Carbon and Carbide) --; column 12, line 12, after "-O", and before the bracket insert a dash.

Signed and sealed this 27th day of December 1960.

(SEAL)
Attest:

KARL H. AXLINE                                        ROBERT C. WATSON
Attesting Officer                                 Commissioner of Patents